Howard J. Kerr
James Fletcher
Lambert Kooistra
George A. Watts
INVENTORS

BY
ATTORNEY

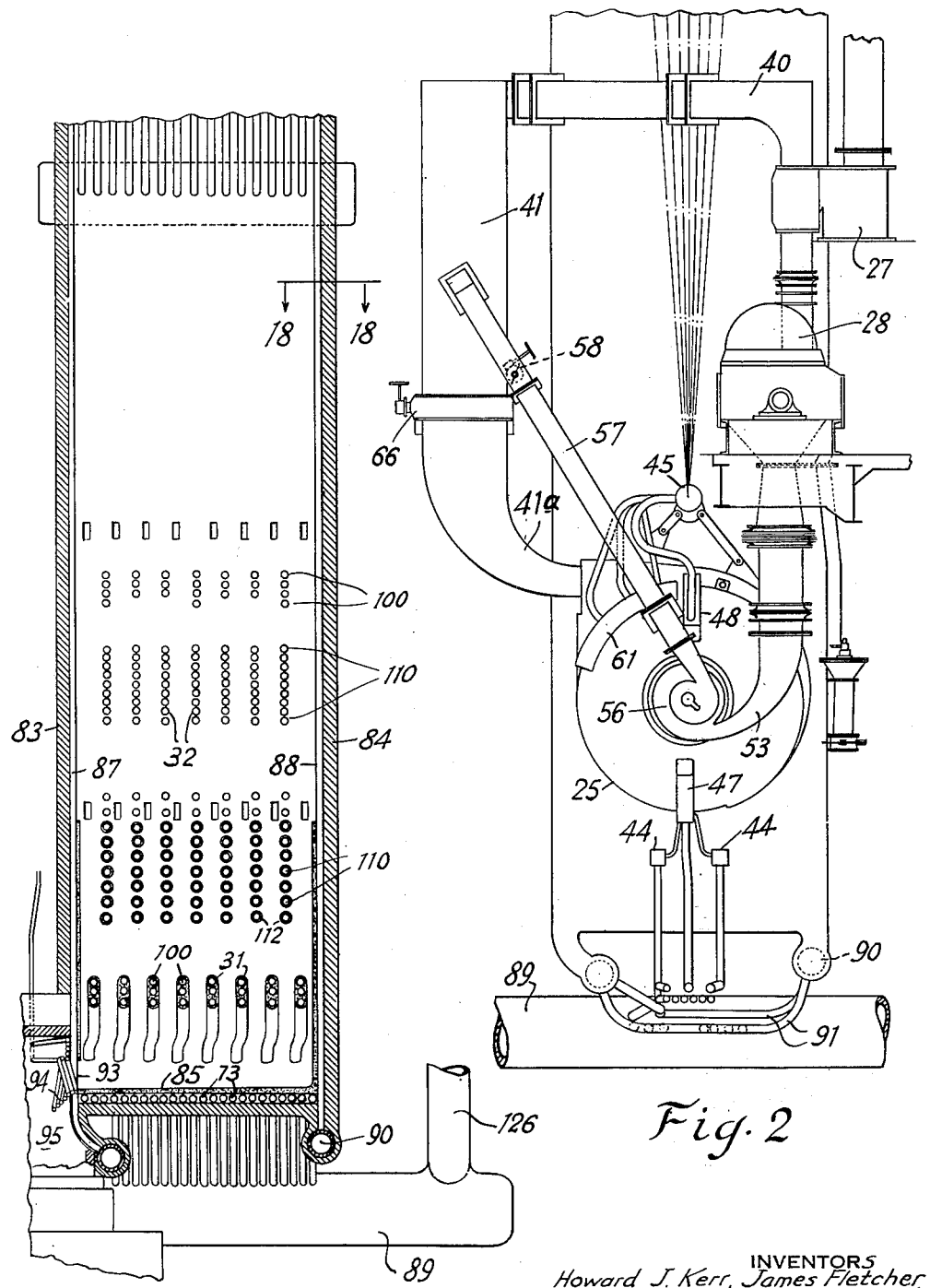

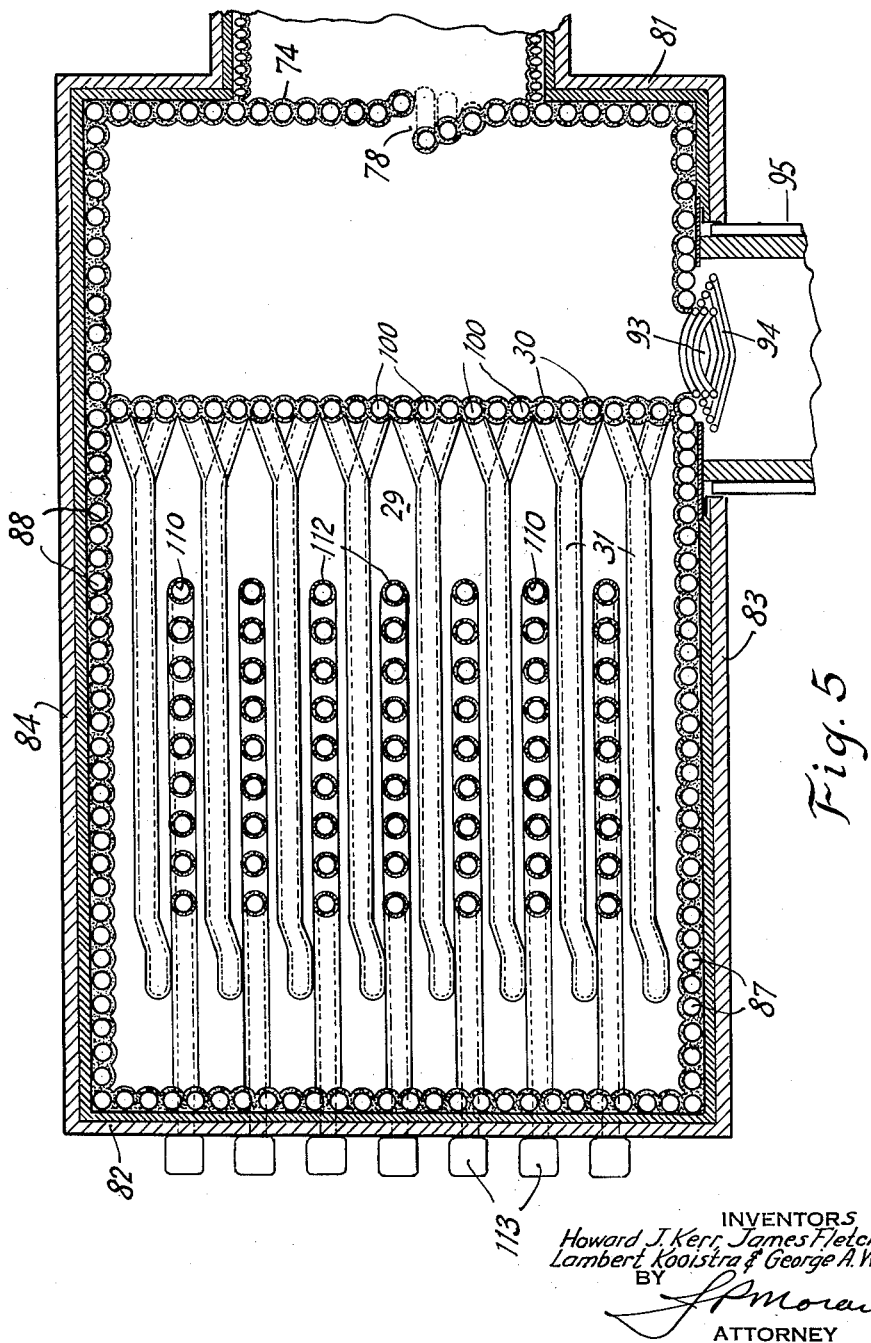

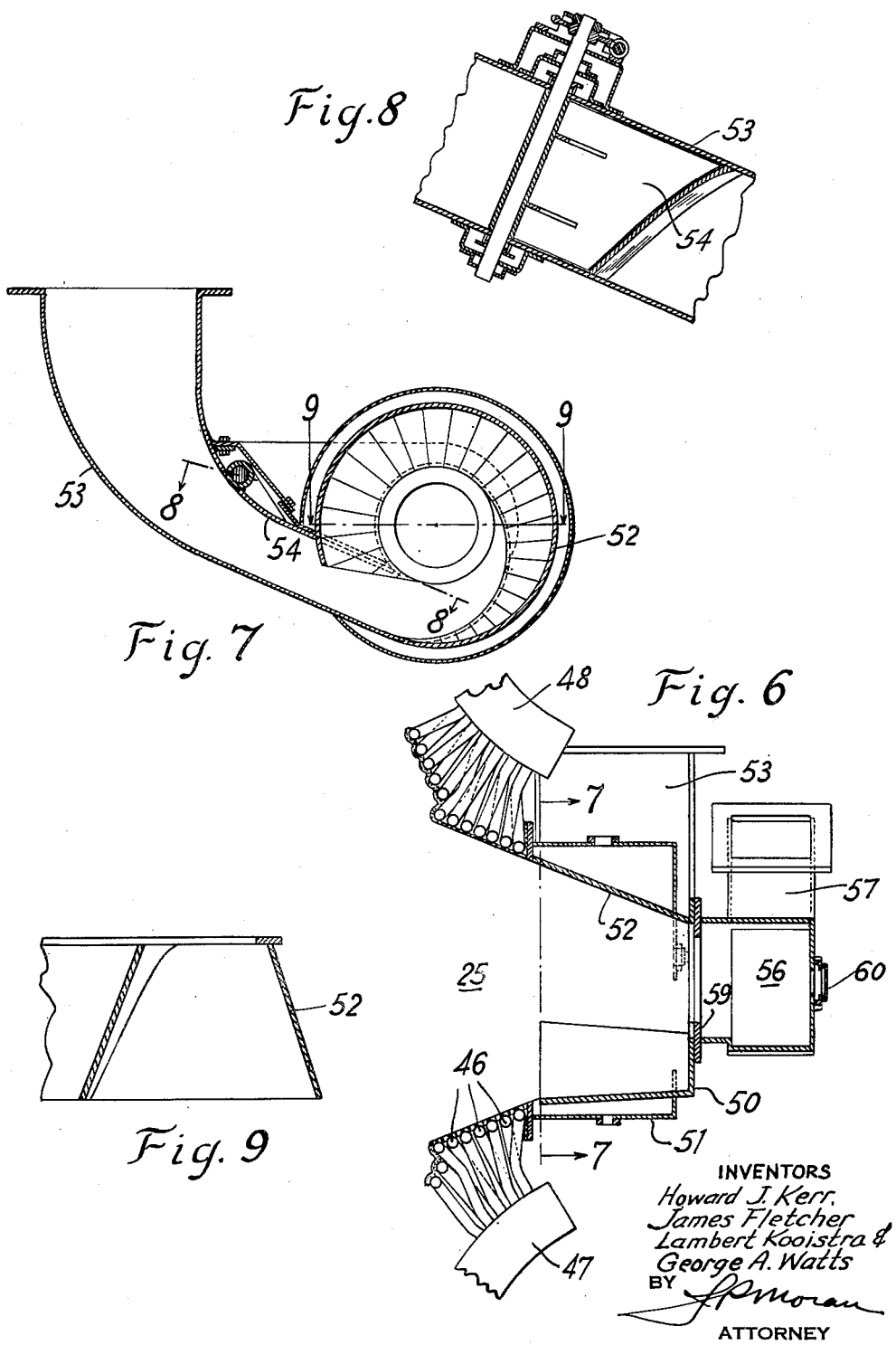

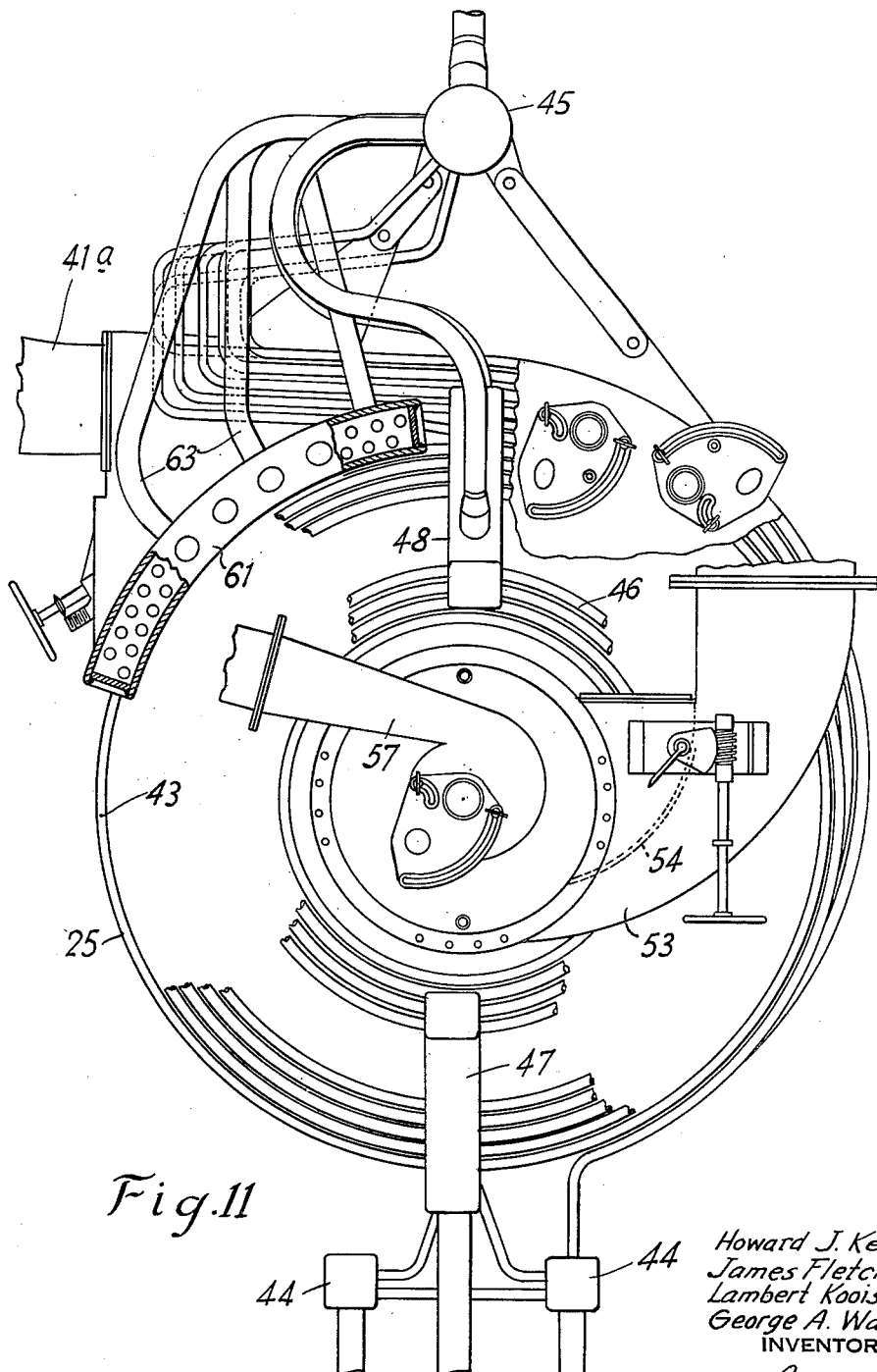

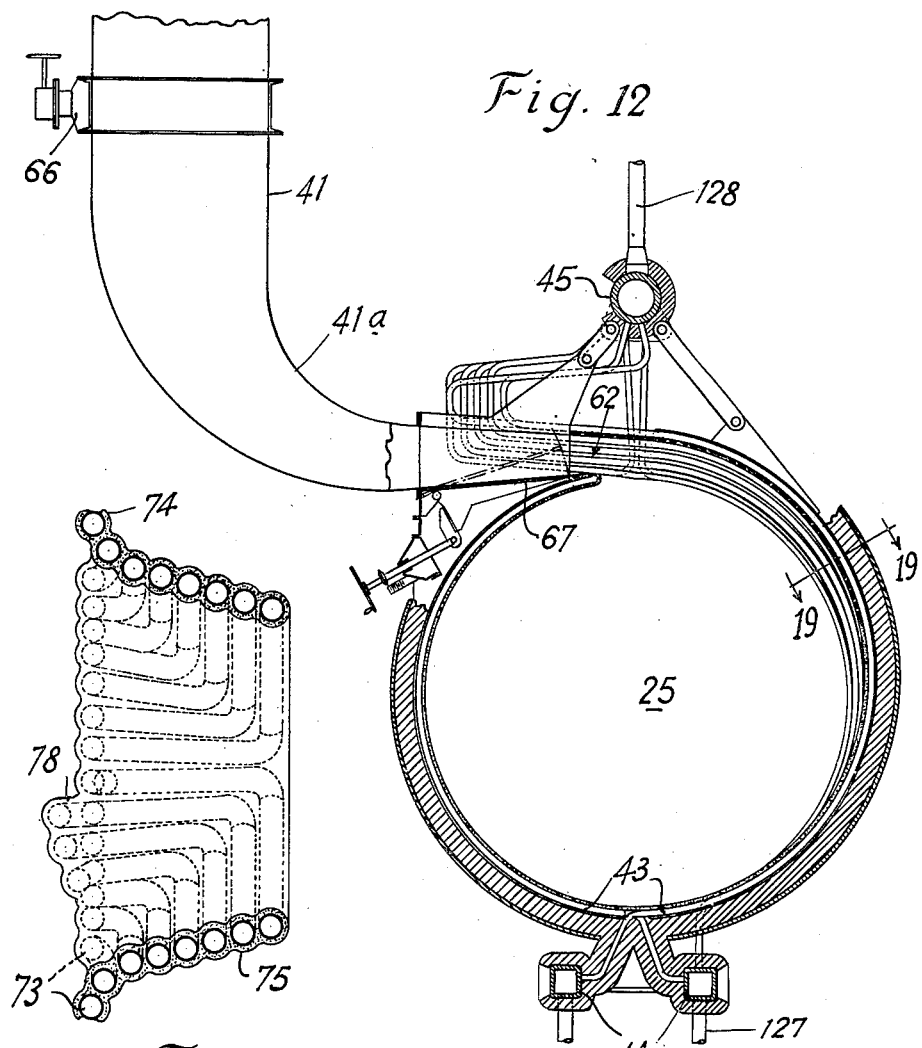
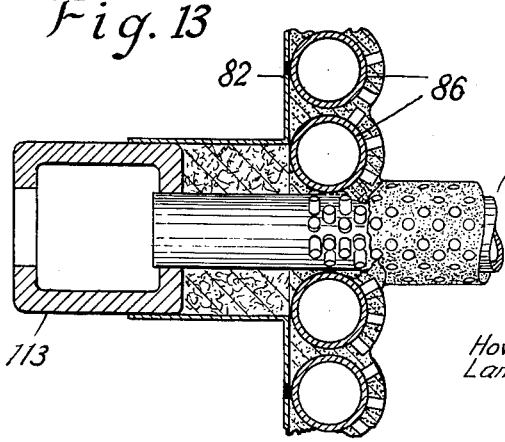

Patented Apr. 29, 1952

2,594,312

UNITED STATES PATENT OFFICE 2,594,312

FUEL BURNING APPARATUS

Howard J. Kerr, Westfield, N. J., and James Fletcher and Lambert Kooistra, Akron, and George A. Watts, Barberton, Ohio, assignors to The Babcock & Wilcox Company, Rockleigh, N. J., a corporation of New Jersey Application August 31, 1944, Serial No. 552,120

6 Claims. (Cl. 122—235)

The present invention relates in general to the construction and operation of apparatus for burning ash-containing solid fuels, and more particularly, to the construction and operation of fluid heating units especially adapted and particularly designed for the burning of an ash-containing crushed or granular fuel at temperatures above the fuel ash fusion temperature in an associated "cyclone" type furnace of the general type disclosed in our prior copending joint application with E. G. Bailey, Serial No. 382,262, filed March 7, 1941, which issued September 5, 1944 as U. S. Patent 2,357,301.

While various kinds of liquid, gaseous and solid fuels can be burned in apparatus embodying our invention, the apparatus hereinafter described is especially designed for burning bituminous and semi-bituminous coals having an ash fusion temperature below 2800° F. and reduced to an aggregate or mixture of particle sizes not over ½". For example, a granular Kincaid coal having a proximate analysis as fired of fixed carbon 41.4%, volatile matter 42.2%, moisture 11.8%, and ash 16.4%, an ash fusion temperature of 2350° F., and a heat value of 10421 B. t. u./lb., and a screen analysis of 100% through a #4 screen, 94.7% through #10, 45.6% through #30, 27.2% through #50, 13.2% through #100, and 6.7% through #200, has been successfully burned in apparatus of the character described.

The general object of our invention is the provision of improved construction of a fluid heating unit adapted to be fired by a cyclone type furnace burning an ash-containing granular fuel and characterized by a high thermal efficiency and a substantially complete recovery of the recoverable portion of the fuel ash as molten slag. A further and more specific object is the provision of an improved wall construction permitting the operation of the unit over a wide range of capacities under a substantial positive pressure. Another specific object is the provision of an improved construction and operation of the secondary combustion air supply system to the cyclone furnace. Another specific object is an improved construction of a secondary furnace receiving the products of combustion directly from a cyclone type primary furnace. A further specific object is the provision of a vapor generating unit having a cyclone type primary furnace and a secondary furnace of the character described and which is further characterized by a special arrangement of fluid heating surface effecting a high thermal efficiency, permitting long operating periods without external tube cleaning, and a low draft loss therethrough.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of our invention.

Of the drawings:

Fig. 2 is a front elevation of the lower portion of the unit shown in Fig. 1;

Fig. 3 is an enlarged vertical section taken on the line 3—3 of Fig. 1;

Fig. 5 is a plan section taken on the line 5—5 of Fig. 4;

Fig. 6 is an enlarged sectional elevation of the primary burner;

Fig. 7 is a vertical section taken on the line 7—7 of Fig. 6;

Figure 1:
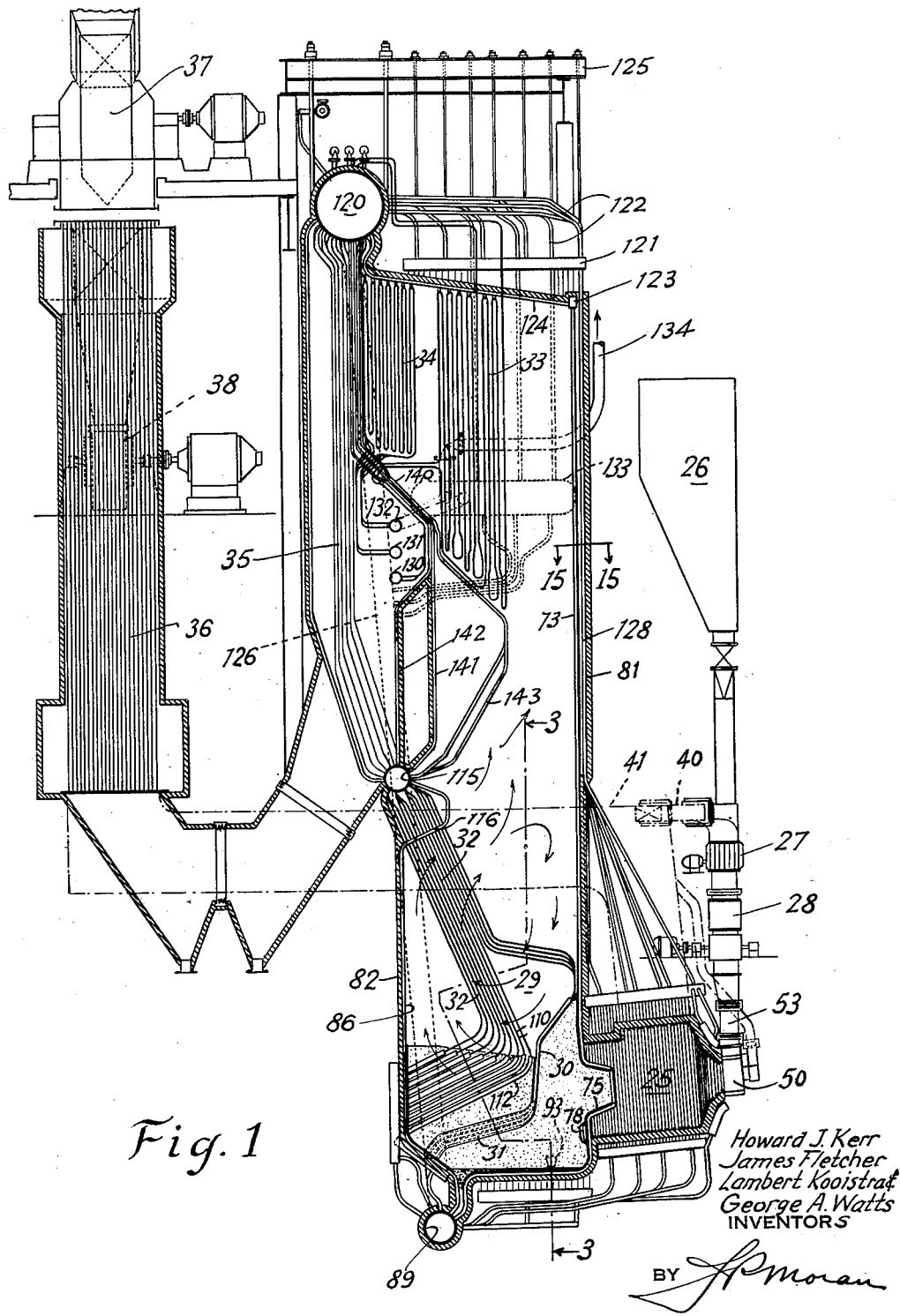
Fig. 1 is a partly diagrammatic sectional elevation of a steam generating unit constructed in accordance with the present invention.
Figure 4:
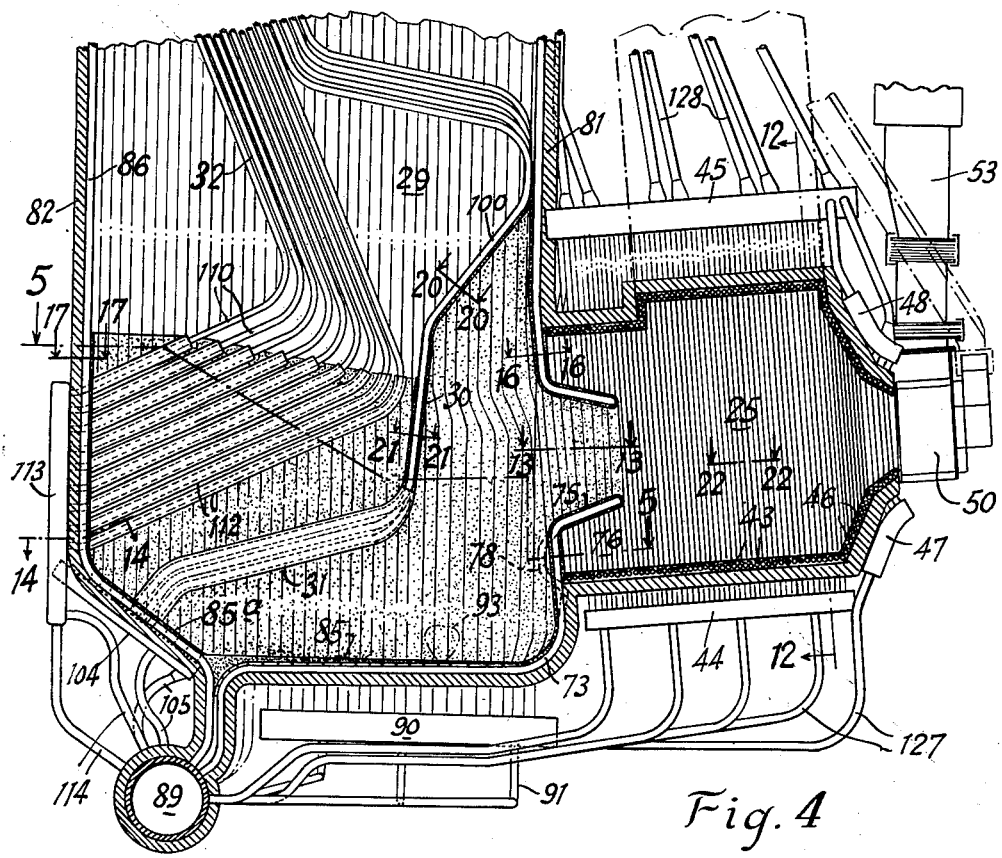
Fig. 4 is an enlarged view of the lower part of Fig. 1.
Figure 10:
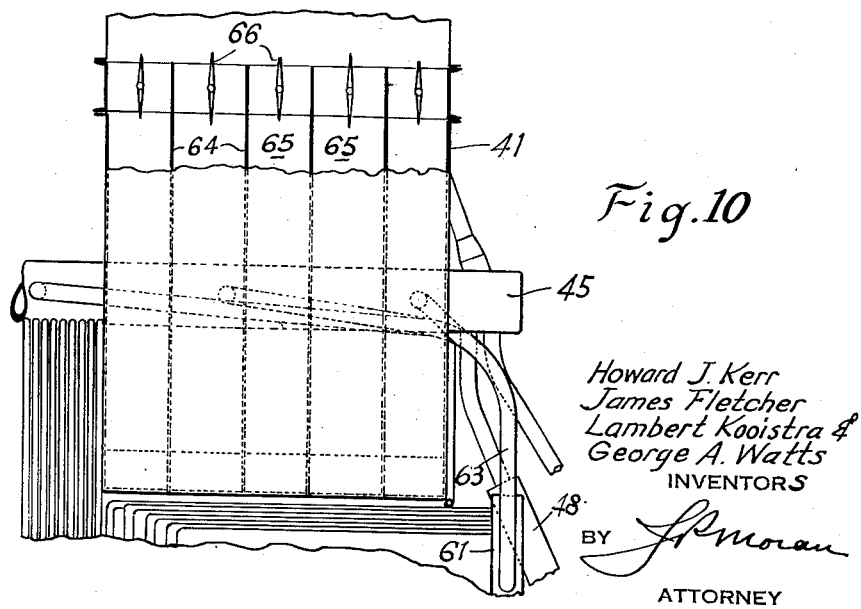
Figure 15:
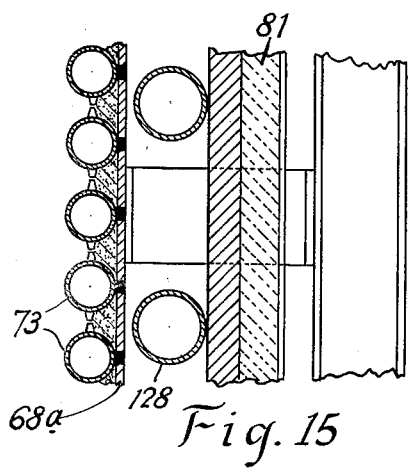
Figure 18:
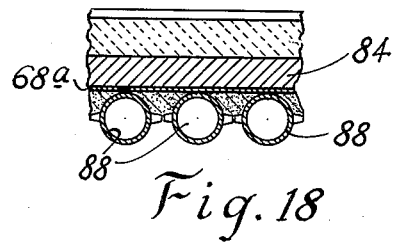
Figure 16:
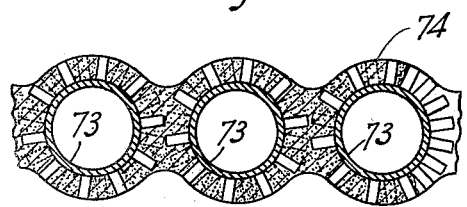
Figure 19:
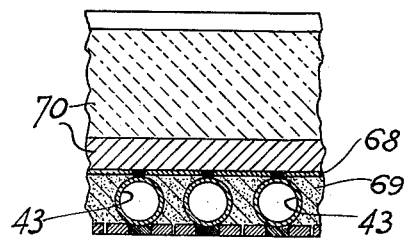
Figure 17:
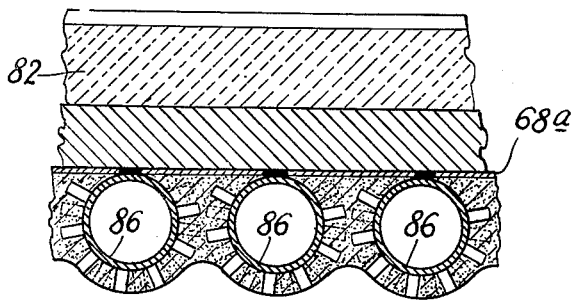

Figs. 8 and 9 are sections taken on the lines 8—8 and 9—9 respectively of Fig. 7;

Fig. 10 is an elevation partly broken away of part of the secondary air duct;

Fig. 11 is a front view partly broken away of the cyclone type primary furnace;

Fig. 12 is an enlarged vertical section taken on the line 12—12 of Fig. 4;

Figs. 13 and 14 are enlarged plan sections taken on the lines 13—13 and 14—14 respectively, of Fig. 4;

Fig. 15 is an enlarged plan section taken on the line 15—15 of Fig. 1;

Figs. 16 and 17 are enlarged plan sections taken on the lines 16—16 and 17—17 respectively of Fig. 4;

Fig. 18 is an enlarged plan section taken on the line 18—18 of Fig. 3;

Fig. 19 is an enlarged section taken on the line 19—19 of Fig. 12; and

Figure 20:
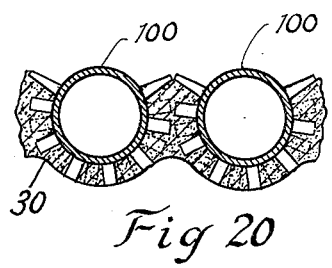
Figure 22:
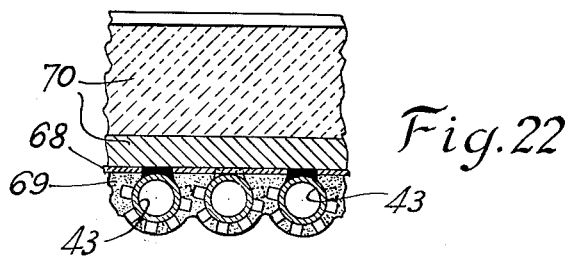
Figure 21:
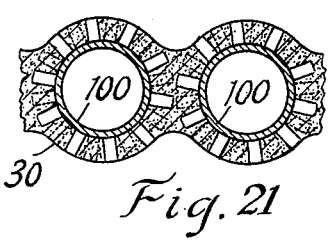

Figs. 20-22 are enlarged plan sections taken on the lines 20—20, 21—21, and 22—22 respectively of Fig. 4.

The steam generating unit as illustrated in Fig. 1 comprises as its main parts a cyclone type primary furnace 25 which is preferably fired by a crushed or granular fuel, such as bituminous or semi-bituminous coal, the fuel being conditioned by feeding raw coal from a supply hopper 26 through a suitable table feeder 27 to a hammer type coal crusher 28, wherein the coal is crushed to the desired range of fineness and delivered with a supply of preheated primary or carrier air to the primary furnace 25. The products of combustion from the primary furnace flow into a secondary furnace 29 containing a reflecting arch 30, slag screen 31 and vertical tube platens 32 with which the products of combustion successively contact. The gaseous products of combustion flow upwardly in the secondary furnace, then horizontally across steam superheater sections 33 and 34, and then downwardly over a vertical steam generating tube bank 35. After leaving the tube bank 35 the gases flow upwardly through a tubular air heater 36 and induced draft fan 37 to the stack. The air for combustion is supplied by a forced draft fan 38.

The fuel conditioning apparatus consists of the table feeder 27 and the crusher 28 arranged below the hopper 26. The coal from the hopper passes through the feeder by gravity and at the feeder discharge is joined by a regulable supply of preheated primary air from a branch duct 40 connected to the main air duct 41. The primary air and coal enter the crusher 28 where the coal is reduced to a granular condition and the stream of primary air and granular coal discharged at a relatively high positive pressure to the primary burner of the cyclone furnace. The crusher is preferably a constant speed machine and the amount of coal to the crusher is varied by either changing the speed or the gate opening of the table feeder 27, or both.

As shown in Figs. 4, 6, 11, 12, 19 and 22 the cyclone type primary furnace 25 is of horizontally elongated substantially circular cross-section, the circular boundary wall being formed by closely spaced studded tubes 43 covered by a layer of refractory material, as shown in Fig. 22, each tube having a semi-circular bent portion and adjacent tubes having their bent portions oppositely arranged to form the circumferential wall. The lower ends of the wall tubes are connected to interconnected supply headers 44 and their upper ends to a discharge header 45. The primary furnace is preferably set with its longitudinal axis at a slight angle to the horizontal to facilitate gravity draining of molten slag into the secondary furnace. The outer end portion of the primary furnace is tapered outwardly in cross-section and formed by closely spaced circular studded tubes 46 of progressively smaller diameter connected by T fittings to a make-up header 47 and riser header 48, the latter being connected to the discharge header 45. The tubes 46 at the smaller end of the furnace carry flat plate studs thereon, of the type shown in Fig. 19, with the spaces between the studs on each tube filled with weld metal to form a smooth surface. The circular tubes 46 thus form a smooth double frusto-conical section symmetrically arranged relative to the chamber axis and forming a continuation of the primary coal burner or fuel inlet chamber 50. The burner 50 has a cooling jacket 51 surrounding an inwardly flaring frusto-conical burner cone 52, into the lower side of which an involute curved primary air-coal pipe 53 opens. The pipe 53 tapers in vertical cross-section towards the burner cone 52, as shown in Fig. 7, and its effective flow area and thereby the velocity of the fuel-air stream is controlled by a manually operated control damper 54 hinged along the upper side of the pipe 53 and shaped as shown in Figs. 7 and 8 to maintain the entering stream of primary air and granular coal distributed along the wall of the burner cone 52. A radial and a forward motion is imparted to the coal-air stream by the burner cone and the whirling stream moves axially of the primary furnace in a helical path along and in contact with the circular refractory-faced furnace wall.

A circular tertiary air chamber 56 is arranged on the outer end of the burner cone 52 and preheated air is supplied thereto by a branch duct 57 controlled by a damper 58. The duct 57 has an involute curved connection to the chamber 56, producing a whirling stream of tertiary air which is directed axially of the burner cone 52 by an orifice plate 59. The resultant suction effect permits the installation and use of an inspection door 60 in the outer end of the chamber 56. In starting up, an oil burner may be inserted through the door 60 or a separate opening to initially heat the primary furnace and ignite the coal when it is introduced.

As shown in Figs. 4 and 10–12, the primary furnace wall tubes 43 along one side are bent radially outwardly along an involute curve for a major portion of the furnace chamber length starting at the inner end of the tapering portion of the chamber, while the corresponding tubes along the opposite side are bent outwardly and connected to an intermediate outlet header 61, cooperating to define an axially elongated secondary air inlet port 62 at a point angularly spaced approximately 180° from the point of entry of the primary air-fuel stream. The outlet header 61 is connected to the discharge header 45 by riser tubes 63.

The main air duct 41 is of rectangular cross-section and terminates in a transversely tapering curved section 41ᵃ fitting into and opening to the secondary air port 62. The lower portion of the duct is subdivided throughout by vertical partitions 64 into a series of side-by-side sections 65 extending longitudinally of the furnace chamber. Each duct section is independently controlled by a shut-off damper 66 at its upper end and a manually operable hinged plate damper 67 at its lower end. As shown in Fig. 12, the dampers 67 are located at the lower side of the duct 41ᵃ and secondary air port 62 and are operable to control the velocity of the corresponding secondary air stream while maintaining the entering air stream at all times along the furnace chamber wall. The portion of the chamber wall first contacted by the secondary air stream is constructed as shown in Fig. 19, with flat plate studs welded to the inner sides of the wall tubes 43 in this section and the inter-stud spaces of each tube filled with weld metal to form a smooth metal surface to minimize slag deposition in that area. The sectional independent formation of the secondary air port permits the point of entry of the secondary air to be varied axially of the furnace chamber to secure the most efficient combustion conditions with different fuels and also to eliminate slag "eye-brows" which tend to form adjacent the secondary air port.

As shown in Figs. 19 and 22, the primary furnace is constructed to permit operation under a relatively high positive furnace pressure and for this purpose a steel casing 68 is welded by spaced plug welds directly to the outer side of the wall tubes 43 and 46, resulting in a completely sealed primary furnace. The intertube spaces are filled with a suitable refractory material 69, such as plastic chrome ore, and several layers of high temperature insulation 70 are applied to the outer side of the casing 68. With this construction the casing 68 will be at substantially the same temperature as the tube metal and will expand and contract with the wall tubes to maintain a fluid-tight construction.

The rear or discharge end of the primary furnace chamber is provided with a gas outlet so arranged that the rearwardly moving whirling stream of burning fuel, air and products of combustion is forced to move inwardly and forwardly, and thus abruptly change its direction axially of the chamber, before reaching the gas outlet and without disrupting its whirling movement. As shown in Figs. 4 and 13, the discharge end of the furnace chamber is formed by a row of closely spaced steam generating tubes 73, each of which has an intermediate portion inclined forwardly, then laterally curved in a semi-circle and rearwardly inclined. These tubes are fully studded and completely covered with a layer of refractory material, as shown in Fig. 16, and cooperate to define a continuous rearwardly flaring throat section 75 of circular cross-section arranged coaxially of the furnace chamber, and an annular rear wall 74 for the primary furnace perpendicular to the axis of the furnace. An annular pocket 76 open at its forward side is thus formed between the throat and the circumferential furnace wall and which in operation causes the whirling gas stream to substantially reverse its direction before entering the throat 75. An angle of flare of approximately 15° to its axis has been found to provide the minimum pressure drop through the throat.

As shown in Figs. 4, 5 and 13, a molten slag outlet from the primary furnace is provided by progressively bending portions of some of the tubes 73 below the throat 75 rearwardly to form a slag outlet 78 adjacent the lowermost level of the primary furnace at a point slightly beyond the vertical center line of the furnace in the direction of gas flow therein. The slag outlet is arranged to require an abrupt change in direction of gases passing therethrough and of sufficient height above the normal slag level in the furnace chamber to permit such gas flow.

In the designed operation of the primary furnace construction described, preheated air is supplied by the air heater 36 to the main air duct 41 at a high positive pressure and split into three streams, 15–20% being used as primary air, 75–80% as secondary air and 3–4% as tertiary air. The total air supplied preferably ranges between 105 and 115% of the theoretical combustion requirements. The fuel burning process is substantially identical with that described in our said joint application, the primary air-fuel stream entering the furnace chamber in a high velocity stream whirling in a clockwise direction with an inner core of tertiary air whirling in the same direction. The fuel-air mixture rapidly ignites and the burning stream flows longitudinally of the furnace chamber at a high angular velocity in a film or layer following a helical path along and in close contact with the furnace circumferential wall. The secondary air enters at substantially the same velocity and direction and gradually merges with the burning stream of primary air and fuel, without disrupting the helical flow path of the latter or separating the primary air-fuel stream from the circumferential chamber wall by a layer of secondary air. Combustion proceeds at a rapid rate sufficient to maintain a normal mean temperature in the furnace chamber over a wide range of operation substantially above the fuel ash fusion temperature. Under such combustion conditions, the ash content of the fuel is rapidly released in a molten condition and due to the centrifugal effect thereon, the furnace chamber walls, and particularly the circumferential wall, will be rapidly coated with a film of molten slag which adheres to the refractory face of the walls and provides a sticky surface against which the fuel particles in the contacting fuel-air stream are thrown and to which they adhere. The whirling stream of burning fuel and oxygen-containing gases effects a scrubbing and burning of the fuel particles on the slag film on the furnace wall. Most of the lighter fuel particles burn in suspension while in the whirling stream along the circumferential wall and the heavier fuel particles on the chamber walls, the slag coating thereon acting to retard the travel of the fuel particles and to retain them in the furnace chamber until combustion is complete. The slag coating or film on the furnace walls rapidly reaches in equilibrium thickness dependent upon the relative values of the ash fusion temperature, the means furnace temperature maintained, the furnace wall temperature, and the velocity of the contacting gas stream. As additional slag deposits on the walls, it will flow down to the bottom of the furnace chamber under the action of gravity, and then rearwardly through the slag outlet 78. The flow reversing action effected by the annular pocket 76 facilitates the separation of suspended slag particles from the outgoing gases and retards the discharge of combustibles from the furnace chamber. Incompletely burned fuel particles separate from the gas stream and are scrubbed by the oxygen-containing gases while in the pocket. The ash released either remains on the wall surfaces of the pocket or flows down the walls thereof to join the slag on the furnace bottom and be removed therefrom. The gases discharged through the throat 75 contain little, if any, combustible, combustion being substantially completed in the primary furnace chamber. A small amount of fly ash and molten slag particles is present in suspension in the outgoing gases, and this residue is largely removed in the secondary furnace chamber as hereinafter described.

The cyclone type primary furnace described serves as the firing means for the steam generating unit, the lower portion of which forms the secondary furnace chamber 29 of a special construction to eliminate substantially all the remaining ash and slag particles in the high temperature heating gases and to cool the heating gases below the fuel ash initial deformation temperature before the gases contact with any bare fluid heating tubes. The secondary furnace chamber is of rectangular horizontal cross-section, being defined by a water cooled front wall 81, rear wall 82, opposite side walls 83 and 84, and a floor 85. The tubes 73 forming the rear wall and throat of the primary furnace are advantageously extended to line the furnace floor 85 and front wall 81, the tube portions along the floor being covered with Bailey blocks and a layer of refractory material to form a slag-holding bottom. A row of refractory covered studded tubes 86 line a rearwardly inclined sectin 85a of the furnace floor and extend upwardly along the rear wall 82. Tube rows 87 and 88 line the side walls 83 and 84 respectively. The tube rows 73 and 86 are directly connected to a transverse horizontal lower water drum 89, while the tube rows 87 and 88 are connected to the drum 89 through side wall headers 90 and supply tubes 91. Some of the tubes 87 are bent to define a slag outlet 93 in the forward part of the side wall 83 at the floor level thereof. A separate tube coil 94 forms a continuation of the slag outlet 93 and conducts the discharging slag to a subjacent slag tank 95. The molten slag from the primary furnace outlet will thus flow down the front wall tubes 73 and accumulate on the floor 85 until discharged through the slag outlet 93.

The secondary furnace chamber 29 includes a row of inclined tubes 100, the lower portions of which are studded and covered with refractory material, and arranged as shown in Figs. 3–5 to form the inclined refractory-faced reflecting arch 30 extending downwardly between the side walls 83, 84 from the front wall 81 to a level opposite the gas outlet throat 75. The upper part of the arch is formed by partly studding the tubes as shown in Fig. 20 and the lower part by fully studding the tubes as shown in Fig. 21, and applying refractory material to close the intertube spaces. Below the arch 30 the tubes 100 are bent into transversely spaced vertically aligned tube groups to define an inclined furnace slag screen 31 between the lower end of the arch and the inclined floor section 85ª. The tubes in each slag screen group are connected by a common covering of refractory material. The tubes 100 are connected to bottom headers 104, supplied by tubes 105 from the drum 89. The corresponding portions of the side wall tubes 87 and 88 and front wall tubes 73 are studded and refractory faced. With this construction a high temperature zone is maintained in the secondary furnace space between the tubes 100 and the primary furnace, insuring a normal mean temperature therein above the fuel ash fusion temperature and sufficient to maintain the discharging slag therein in a molten condition.

The reflecting arch causes the heating gases leaving the outlet throat 75 to flow downwardly towards the furnace floor, and then rearwardly and upwardly through the furnace slag screen, the abrupt change in direction causing ash and slag particles to separate from the gases onto the furnace floor. The slag screen 31 accumulates a layer of sticky slag which collects additional ash and slag particles from the gases, excess accumulations flowing down to the inclined floor section 85ª and thence to the slag outlet 93.

A series of reversely L-shaped tubes 110 are arranged in rearwardly aligned transversely spaced groups in the secondary furnace above the slag screen 31. The lower legs of these tubes are fully studded, as shown in Fig. 14, and either originally covered with a layer of refractory material as shown or installed without the refractory layer and the layer formed by deposited slag. The refractory covered tube portions so formed constitute a secondary slag screen 112 in alignment with the spaces between the slag screen tube groups 31. The tubes 110 have their lower ends connected through vertical headers 113 and connecting tubes 114 to the drum 89.

The upright legs of the tubes 110 are bare and the tubes in each group arranged substantially in contact to form transversely spaced vertically inclined tube platens 32 extending between the forward end of the secondary slag screen and in intermediate horizontal water drum 115 at the rear wall 82. The inclined bare portions of the tubes 100 above the reflecting arch 30 are arranged in similarly spaced groups in vertical alignment with the tube platens 32 and also connected to the drum 115, as shown in Figs. 1 and 3. The upper end portions of the rear wall tubes 89 extend across the upper portions of the tubes 110 and 100 to connect with the drum 115, providing in effect an inclined tube baffle 116 tending to deflect the ascending gas stream forwardly away from the drum 115.

The described construction and formation of the tubes 100 and 110 and the arrangement of the reflecting arch 30 and tube baffle 116 relative thereto are especially designed to establish a recirculation of a substantial amount of the heating gases in the path indicated by the arrows in Fig. 1, thereby effecting a substantial drop in gas temperature immediately above the horizontally inclined legs of the tubes 110 sufficient to reduce the temperature in this zone below the fuel ash initial deformation temperature, at the lower limit of the ash fusion range, above which temperature the gas suspended ash particles are in a sticky condition. The ascending gas stream leaving the secondary slag screen 112 is lowered in temperature by the tube platens 32 and partly studded wall tubes. Recirculation of these gases downwardly over the tubes 100 and lower part of the tube platens further reduces the gas temperature and the merging of the recirculated gases with the main gas stream in the space above the secondary slag screen is sufficient to lower the mean temperature of the gases to a value at which any ash or slag particles remaining in suspension will not stick to the tube platens, wall tubes or subsequent heat absorbing surface in the flow path but will pass out of the unit with the gases as dry fly ash.

The portion of the unit above the secondary furnace chamber contains the main convection heating section consisting of primary and secondary superheater sections 33, 34 and a steam generating bank 35 connecting the intermediate water drum 115 to a main steam and water drum 120 horizontally arranged across the top of the unit. The side walls 83, 84 and side wall tubes 86, 87 are continued upwardly throughout the upper section of the unit, the tubes 86, 87 being connected through upper headers 121 and riser tubes 122 to the upper drum 120. The front wall tubes 73 continue upwardly to a top header 123, from which roof tubes 124 extend to the drum 120. Both the secondary furnace chamber 29 and upper section of the unit have a sealing steel casing 68ª welded to the wall and roof tubes, similarly to the cyclone type primary furnace casing 68, to permit the operation of the whole unit under a positive pressure and to provide for thermal expansion and contraction of the casing along with the associated generating tubes. As shown in Fig. 1, the steam generating unit is top-supported from the structural steel 125.

The steam generating unit shown is of the natural circulation type, feed water being supplied to the upper drum 120 and that drum interconnected to the lower water drum 89 by two large diameter downcomer pipes 126 located at opposite sides of the unit. Water is supplied to all of the furnace wall and screen circuits from the drum 89. A parallel circuit is maintained through the primary furnace tubes 43 and 46 by supply tubes 127 connecting the headers 44 and 47 to the drum 89 and riser tubes 128 connecting the header 45 to the upper drum 120. As shown in Figs. 1 and 15, the riser tubes 128 extend within the front wall 81 at the outer side of the tubes 73 and steel casing 68ᵃ and have their upper ends connected to the drum 120. An upward circulation is maintained through the tubes 86, 100 and 110 to the drum 115 and thence through the generating tube bank 35 to the drum 120.

The steam superheating surface of the unit consists of a primary superheater section 33 and secondary section 34, both of the continuous tube pendant type and located in the uppermost part of the unit. The superheater tubes are supported from the roof tubes 124. Steam from the drum 120 passes through the primary section to an outlet header 130 and then to a submerged attemperator (not shown) at one side of the unit. The steam from the attemperator enters the inlet header 131 of the secondary superheater section 34 and flows back through these superheater tubes to an outlet header 132, from which it passes to a submerged desuperheater 133 at the opposite side of the unit having a steam discharge pipe 134. The main generating tube bank 35 is located at the rear of the secondary superheater section 34. The front rows of tubes in this bank are bent away from the remainder of the bank to form an inclined tube floor 140 below the secondary superheater section 34. Below the floor 140 these tubes are arranged with plate studs and intervening refractory to form a rear wall 141 for the corresponding section of the secondary furnace chamber, a front wall 142 for the main generating section 35, and a boiler screen 143 below the primary superheater section.

The heating gases flow rearwardly across the superheater sections in a single pass and then downwardly along the generating tube bank 35. The outgoing gases pass upwardly through the tubes of the air heater with the air from the forced draft fan 38 flowing around the tubes 36 to the main air duct 41.

The steam generating unit illustrated is designed for operation both with and without the induced draft fan 37 or equivalent draft producing means in use. With both the forced draft fan 38 and induced draft fan 37 in operation, the discharge pressure of the forced draft fan and draft of the induced draft fan are adjusted to maintain a substantial positive pressure in the primary furnace chamber, zero pressure in the lower portion of the secondary furnace adjacent the slag outlet 93, and a negative pressure throughout the remainder of the unit. Under these conditions there will be no discharge of high temperature gases through the slag outlet 93.

The unit may also be operated with only the forced draft fan in use. In that case all of the combustion air is supplied at a high positive pressure, e. g. 40 in. H₂O, to the primary furnace chamber and a decreasing positive pressure maintained throughout the remainder of the unit. The casing connection to the adjacent water tubes is especially adapted for such service.

With the described construction, granular fuel of the character described can be efficiently burned at high rates of heat release with only a small amount of excess air, and separation and removal of over 90% of the fuel ash content recoverable as molten slag. Any ash remaining with the discharged heating gases in suspension will be in the form of a dry ash and will normally present no operating problem.

Certain features disclosed and claimed herein are also disclosed in our said joint application.

We claim:

1. A fluid heating unit having a fluid circulating system and comprising a circumferential wall defining a primary furnace chamber of substantially circular cross-section arranged with its axis substantially horizontal, a row of fluid heating tubes for said wall, means for introducing a whirling stream of air and ash-forming fuel in suspension into one end of said primary furnace chamber and effecting a helical path of travel thereof along the circumferential wall of said chamber, a separate row of fluid heating tubes forming the opposite end wall of said furnace chamber and having bent portions defining an inwardly projecting gas outlet throat flaring towards its discharge end, means for introducing a high velocity stream of combustion air at a location in said chamber between the point of fuel entry and the chamber gas outlet, a slag outlet in the lower part of said chamber, a secondary furnace chamber laterally adjacent and opening to said primary furnace chamber gas outlet throat, an upper and a lower pressure vessel disposed respectively at elevations adjacent the upper and lower limits of said secondary furnace chamber, and downcomer means connecting said vessels, said separate rows of fluid heating tubes communicating with each of said vessels to form parallel natural circulation circuits of said fluid circulating system.

2. A fluid heating unit of the natural circulation type comprising a circumferential wall defining a primary furnace chamber of substantially circular cross-section arranged with its axis substantially horizontal, a row of fluid heating tubes for said wall, means for introducing a whirling stream of air and ash-forming fuel in suspension into one end of said primary furnace chamber and effecting a helical path of travel thereof along the circumferential wall of said chamber, a separate row of fluid heating tubes forming the opposite end wall of said furnace chamber and having bent portions defining an inwardly projecting gas outlet throat flaring towards its discharge end, means for introducing a high velocity stream of combustion air at a location in said chamber between the point of fuel entry and the chamber gas outlet, a slag outlet in the lower part of said chamber, a secondary furnace chamber laterally adjacent and opening to said primary furnace chamber gas outlet throat, and said throat fluid heating tubes being extended to line the adjacent defining wall of said secondary furnace chamber, an upper and a lower pressure vessel disposed respectively at elevations adjacent the upper and lower limits of said secondary chamber, downcomers connecting said vessels, fluid inlet connections extending from said lower vessel to said rows of fluid heating tubes, and fluid outlet connections separately connecting the respective rows of said fluid heating tubes to said upper drum.

3. A fluid heating unit having a fluid circulating system and comprising walls defining a primary furnace chamber of substantially circular cross-section arranged with its axis substantially horizontal, fluid heating tubes for said walls, said walls including a circumferential wall for which the tubes are arranged at horizontally opposite sides of said axis and successive tubes at said sides are formed with semi-circular bent portions oppositely arranged and conforming to the contour of said wall, means for introducing a whirling stream of air and ash-forming fuel in suspension into one end of said primary furnace chamber and effecting a helical path of travel thereof along the circumferential wall of said chamber, a gas outlet at the opposite end of said chamber, means for introducing a high velocity stream of combustion air at a location in said chamber between the point of fuel entry and the chamber gas outlet, a slag outlet in the lower part of said chamber, a secondary furnace chamber laterally adjacent and opening to said combustion chamber gas outlet, a row of fluid heating tubes and refractory material cooperating to define a vertically disposed fluid cooled reflecting arch in said secondary furnace chamber in the gas flow path from said gas outlet, a slag outlet in said secondary furnace chamber below said reflecting arch, and means connecting said wall and arch fluid heating tubes into the circulating system of said fluid heating unit for natural circulation of fluid through all of said tubes.

4. A cyclone furnace having a furnace chamber of substantially circular cross-section arranged with its axis substantially horizontal and defined by walls having an inner exposed refractory surface, means forming a fuel inlet chamber opening to one end of said furnace chamber, means for introducing a stream of primary air and an ash-forming fuel in suspension into one end of said fuel inlet chamber in a helical path of travel therein and effecting a helical path of travel thereof along the circumferential wall of said furnace chamber, means defining a gas outlet at the opposite end of said furnace chamber, means defining an axially elongated secondary air inlet extending through said wall arranged tangentially to said circumferential wall at a location in said furnace chamber between the point of fuel entry and the furnace chamber gas outlet, means for subdividing said secondary air inlet into a plurality of sections, independently operable control damper means in the respective secondary air inlet sections adjacent their discharge ends arranged to vary the effective flow area of the corresponding sections opening into said furnace chamber and discharging directly into the stream of primary air and ash-forming fuel traveling along said circumferential wall, and means forming a slag outlet in the lower part of said furnace chamber.

5. A cyclone furnace having a furnace chamber of substantially circular cross-section arranged with its axis substantially horizontal and defined by walls having an inner exposed refractory surface, means forming a circular fuel inlet chamber of smaller diameter than and opening to one end of said furnace chamber, means for introducing a stream of primary air and an ash-forming fuel in suspension tangentially into said fuel inlet chamber at a high angular velocity and in a helical path of travel therein and effecting a helical path of travel thereof along the circumferential wall of said furnace chamber, means defining a gas outlet at the opposite end of said furnace chamber, means defining an axially elongated secondary air inlet having radially spaced inner and outer boundaries of which the outer of said boundaries is arranged tangentially to the outer end of a curved extension of said circumferential wall at a location in said furnace chamber between the point of fuel entry and the furnace chamber gas outlet, means for subdividing said secondary air inlet into a plurality of sections, independently operable control damper means in the respective secondary air inlet sections arranged to vary the effective flow area of each of the corresponding sections opening into said furnace chamber and discharging directly into the stream of primary air and ash-forming fuel traveling along said circumferential wall, said damper means operating to separately vary the effective radial position of the radially inner boundary of each of said sections, and means forming a slag outlet in the lower part of said furnace chamber adjacent the gas outlet.

6. A fluid heating unit as defined in claim 3 wherein the means by which arch fluid heating tubes are connected into the circulating system comprises upper extensions of said arch fluid heating tubes arranged in horizontally spaced groups across said secondary chamber.

HOWARD J. KERR.
JAMES FLETCHER.
LAMBERT KOOISTRA.
GEORGE A. WATTS.

REFERENCES CITED

The following references are of record in the file of this patent:

UNITED STATES PATENTS

| Number | Name | Date |
|---|---|---|
| 836,219 | Schutz | Nov. 20, 1906 |
| 1,306,233 | Schutz | June 10, 1919 |
| 1,306,234 | Schutz | June 10, 1919 |
| 1,306,235 | Schutz | June 10, 1919 |
| 1,618,808 | Burg | Feb. 22, 1927 |
| 1,710,241 | Purcell | Apr. 23, 1929 |
| 1,727,458 | Varcoe | Sept. 10, 1929 |
| 1,774,150 | Murray | Aug. 26, 1930 |
| 1,858,450 | Coutant | May 17, 1932 |
| 1,942,687 | Daniels | Jan. 9, 1934 |
| 1,943,286 | Burg | Jan. 16, 1934 |
| 2,119,624 | Hardgrove | June 7, 1938 |
| 2,160,968 | Hagen | June 6, 1939 |
| 2,206,265 | Saathoff | July 2, 1940 |
| 2,222,769 | Hardgrove | Nov. 26, 1940 |
| 2,357,300 | Bailey | Sept. 5, 1944 |
| 2,357,301 | Bailey et al. | Sept. 5, 1944 |
| 2,357,302 | Kerr et al. | Sept. 5, 1944 |
| 2,357,303 | Kerr et al. | Sept. 5, 1944 |
| 2,397,523 | Bailey | Apr. 2, 1946 |
| 2,416,053 | Grossman | Feb. 18, 1947 |

FOREIGN PATENTS

| Number | Country | Date |
|---|---|---|
| 608,784 | Germany | Jan. 31, 1935 |